United States Patent

Kropfl

[15] 3,680,056

[45] July 25, 1972

[54] USE EQUALIZATION ON CLOSED LOOP MESSAGE BLOCK TRANSMISSION SYSTEMS

[72] Inventor: Walter Joseph Kropfl, Murray Hill, N.J.

[73] Assignee: Bell Telephone Laboratories, Incorporated, Murray Hill, N.J.

[22] Filed: Oct. 8, 1970

[21] Appl. No.: 79,080

[52] U.S. Cl. ........................................340/172.5, 179/15 AL

[51] Int. Cl. ........................................H04j 3/08

[58] Field of Search ..............................340/172.5, 150, 163; 179/15 AL

[56] References Cited

UNITED STATES PATENTS

| | | | |
|---|---|---|---|
| 3,483,329 | 12/1969 | Hunkins et al. | 179/15 AL |
| 3,411,143 | 11/1968 | Beausoleil et al. | 340/172.5 |
| 3,445,822 | 5/1969 | Driscoll | 340/172.5 |
| 3,456,242 | 7/1969 | Lubkin et al. | 340/172.5 |
| 3,480,914 | 11/1969 | Schlaeppi | 340/172.5 |
| 3,517,130 | 6/1970 | Rynders | 179/15 AL |
| 3,544,976 | 12/1970 | Collins | 340/172.5 |
| 3,597,549 | 8/1971 | Farmer et al. | 179/15 AL |

FOREIGN PATENTS OR APPLICATIONS

| | | | |
|---|---|---|---|
| 1,182,363 | 2/1970 | Great Britain | 179/15 AL |

*Primary Examiner*—Paul J. Henon
*Assistant Examiner*—Melvin B. Chapnick
*Attorney*—R. J. Guenther and William L. Keefauver

[57] ABSTRACT

A closed loop transmission system is described in which a plurality of stations have access to the loop to write messages into and read messages from standard-sized message blocks transmitted around the loop. One station provides regeneration of all message blocks. In order to prevent one or more stations from monopolizing the use of the transmission loop, a field is reserved in each message block for setting flags each time a station desires to transmit a message but is unable to do so because the message block is filled. Originating stations are thereafter prevented from initiating a second message until all other requesting stations have been served, as indicated by the flagged field in the message block.

10 Claims, 14 Drawing Figures

PATENTED JUL 25 1972

3,680,056

SHEET 01 OF 10

INVENTOR
W. J. KROPFL
BY R.O. Nimtz
ATTORNEY

SHIFT REGISTER B

START OF BLOCK & DESTINATION CODE DETECTORS

HOG PREVENTION CONTROL CIRCUIT

LOOP AND TYPE CONTROL CIRCUIT

READ-WRITE CONTROL CIRCUIT

COMMAND WORD ENCODER
(A-STATION ONLY)

READ LOGIC

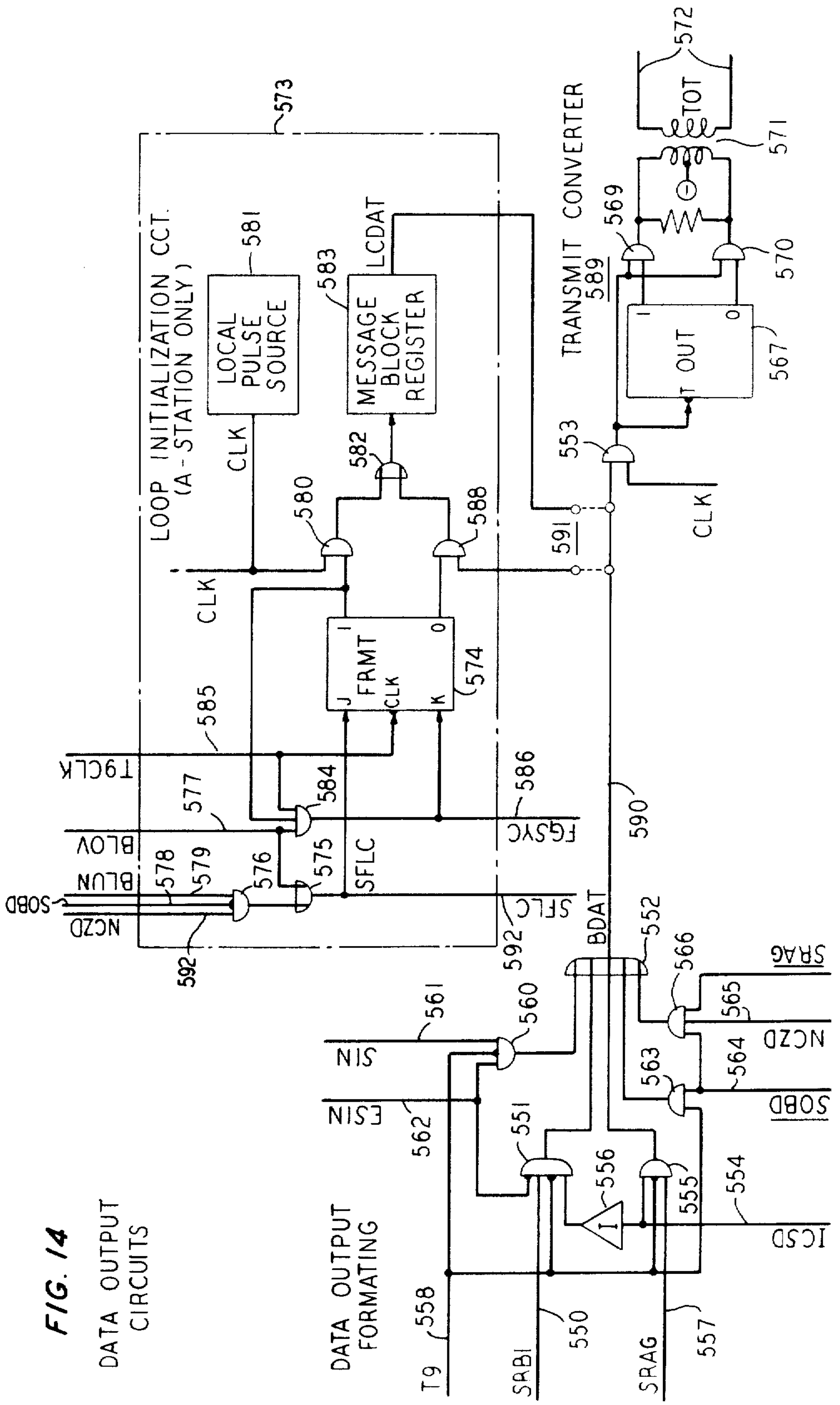
FIG. 14 DATA OUTPUT CIRCUITS

USE EQUALIZATION ON CLOSED LOOP MESSAGE BLOCK TRANSMISSION SYSTEMS

FIELD OF THE INVENTION

This invention relates to digital transmission systems and, more particularly, to digital transmission by message block assignment on a common, time-divided transmission loop.

BACKGROUND OF THE INVENTION

It is often desirable to exchange digital information between digital machines. If such machines are separated by any significant geographic distance, it has heretofore been necessary to either purchase or lease a dedicated transmission facility between such machines, or to arrange a temporary connection between such machines by means of common carrier, switched transmission facilities. Since it is the nature of digital machines to require large amounts of digital channel capacity, but only for brief periods and only occasionally, the heretofore available facilities described above have proven very inefficient for this use. Dedicated transmission facilities, for example, remain unused the vast majority of the time. Switched, common carrier facilities tend to be restricted in bandwidth to voice frequencies and are otherwise unsuitable for digital, as contrasted with analog, transmission.

A further problem with switched facilities is the fact that it often takes more time to set up the transmission path than is required for the entire transmission of data. The telephone network requires real time transmission in the sense that speech signals must be delivered substantially at the same time they are generated. It therefore is standard procedure to set up the communication path in its entirety before any signals are transmitted. As a result, centralized switching has been used in the telephone plant. Digital transmission of data, on the other hand, need not be done in real time, and hence it is wasteful to set up an entire connection prior to transmission. These facts tend to make presently available interconnection facilities uneconomical for intermachine digital communications.

It is an object of the present invention to provide improved digital transmission facilities for communication between digital machines.

It is a more specific object to provide message block buffered data transmission systems operating on closed loop transmission paths.

In closed loop transmission facilities wherein message blocks are launched on the transmission loop by any one of a plurality of data access stations, care must be taken to insure that all stations are given reasonable opportunities to use the facilities. On the other hand, it is relatively difficult to set up a priority arrangement when the data access stations are geographically distributed over a large area.

It is a more specific object of the invention to prevent the monopolization of closed loop transmission facilities by a single user or a smaller number of users.

SUMMARY OF THE INVENTION

In accordance with one aspect of the present invention, a transmission system is provided on which station circuits are interconnected by a closed loop transmission line. One type of station circuit in each loop, which may be called an A-station, serves to close the loop, selectively repeating messages around the loop and providing clocking and synchronizing information for all of the messages on the loop.

Another type of station circuit, which may be called a B-station, utilizes the clock and synchronizing information provided from the A-station to write message blocks into and read message blocks from the transmission loop. The B-stations thus provide the access ports for entry into and retrieval from the transmission loops. Any number of B-stations may be provided on a loop, limited only by the transmission capacity of the loop and the average message rate transmitted by each B-station.

In accordance with yet another aspect of the present invention, monopolization of the transmission facilities by one or more station circuits is prevented by providing special marks within the message block itself which prevent such monopolization. These message bits, called "hog prevention bits," are set to an initial state in response to each B-station which desires to transmit information but is unable to do so because the passing message block is already filled. A station originating a message block is then prevented from originating another message block until all other stations on the loop have had their requests honored, as indicated by the bit pattern in the hog prevention bits.

The monopolization prevention technique described above has the advantage of requiring only minimal logic capability to effectuate the overall function. This advantage is possible because the scheme is under the control of a portion of the message block itself. Schemes which require control lines running to the stations on the loop, on the other hand, are totally unfeasible for a long distance transmission system. Although each access circuit must look at each message block for these bits, this inspection is necessary in any event to ascertain if the message is to be delivered to the local station.

These and other objects and features, the nature of the present invention and its various advantages, will be more readily understood upon consideration of the attached drawings and of the following detailed description of the drawings.

BRIEF DESCRIPTION OF THE DRAWINGS

In the drawings:

FIG. 14 is a detailed circuit diagram of data output circuits useful in the station circuit of FIG. 3.

DETAILED DESCRIPTION OF THE DRAWINGS

Before proceeding to a detailed description of the drawings, it should be noted that all of the circuits described herein may be realized, in the illustrative embodiment, by using integrated circuits. Each of the circuits can be found, for example, in "TTL Integrated Circuits Catalog from Texas Instruments," Catalog CC201, dated Aug. 1, 1969. Similar circuits are available from other manufacturers as listed at pages A-9 through A-24 of the CC201 Catalog.

Figure 1:
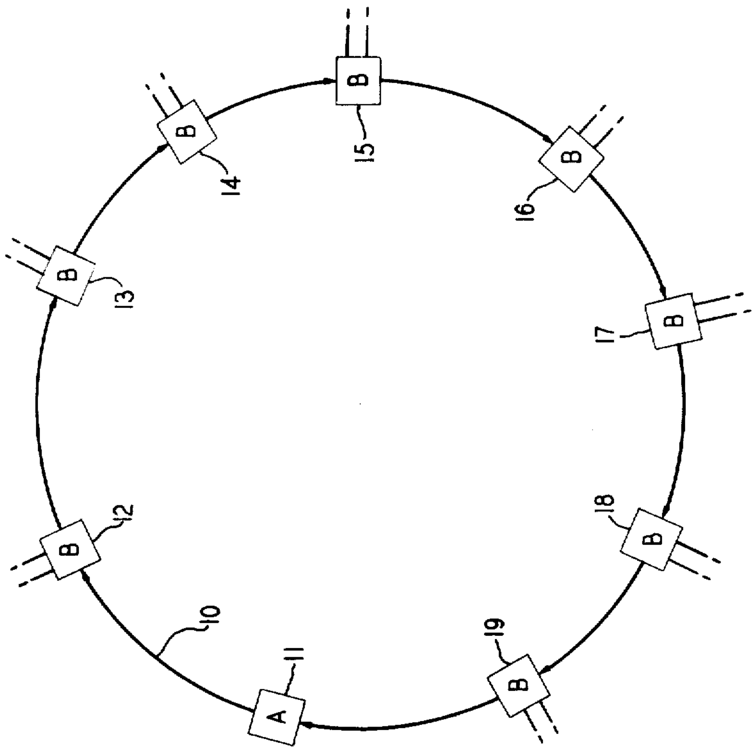
FIG. 1 is a general block diagram of a data transmission system in accordance with the present invention.

Referring more particularly to FIG. 1, there is shown a graphical representation of a closed loop transmission system in accordance with the present invention. Thus, a looped transmission line 10 interconnects a plurality of stations 11 through 19. Station 11, labelled "A" in FIG. 1, is a special station used to provide timing and synchronization as well as of regeneration of message blocks. Thus A-station 11 permits loop 10 to be closed on itself.

Access stations 12 through 19, called "B-stations," permit access to transmission loop 10 from local data sources and to local data utilization circuits. Any number of B-stations can be included on loop 10.

The geographical extent of loop 10 is almost unlimited and may encompass, for example, the entire continental United States. It is only necessary that the transmission capacity of loop 10 be related in a logical fashion to the number and activity levels of the B-stations on the loop.

In operation, data to be transmitted on loop 10 is inserted at one of the B-stations 12 through 19 in a standard length message format and associated with an appropriate address. This message block traverses loop 10, passing A- and B-stations, until the B-station is reached which corresponds to the address at the head of the message block. The message is then delivered to the addressed station and the block marked as vacant and available for use by other B-stations.

In accordance with one aspect of the present invention, such a message block is marked in a unique way by each B-station which is passed which desires to transmit a message and which is unable to do so because the message block is full. These signals are modified each time A-station 11 is passed to reflect the number of times the filled message block traverses the loop. The originating station is prevented, by these message block marks, from initiating a new message block until all requests on the remainder of the loop have been filled. The operation of the system of FIG. 1 will be more readily understood upon consideration of the message block format shown in FIG. 2.

Figure 2:
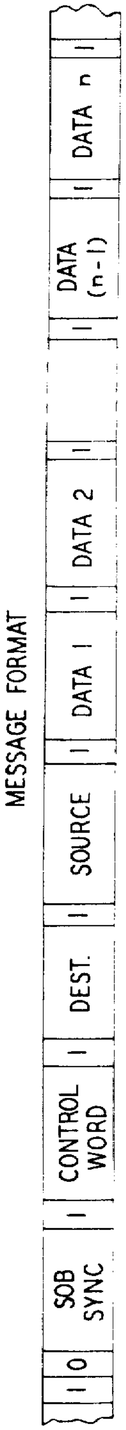
FIG. 2 is a suggested message format for data blocks to be transmitted on the transmission system of FIG. 1.

As can be seen in FIG. 2, each message block consists of a sequence of digital words of standard length. The number of such digital words in each message block is fixed. In the illustrative embodiment of FIG. 2, the message format is composed of 128, eight-bit words, each separated from the others by a guard bit. All of the guard bits are "1's" to prevent long strings of "0's" which would make it difficult to maintain synchronization. Synchronization and timing recovery is also greatly simplified by the repetitive patterns of "1" bits. The above framing bit pattern is violated in only one circumstance: a "0" bit is placed in the initial guard bit preceding the first word of the message block. A start-of-block code comprising all "0's" forms the first word of each message block. Thus the "0" guard bit, together with the "0's" of the start-of-block code, provide the only occurrence of nine consecutive "0's." This occurrence can be detected to start framing and initiate block access for reading or writing purposes.

The second word of each message block comprises a control word which carries a coded representation of the status of the message block, i.e., whether the block is vacant or full, whether the message is private or broadcast, whether the message is for local or foreign delivery and other conditions to be hereinafter described. The detailed contents of this control word will be described later in connection with FIG. 3.

The third word of each message block comprises a destination code indicating the destination to which the message block is to be delivered. Although only one word has been reserved for the destination code in FIG. 2, it is apparent that two or more words may be used for this purpose in order to accommodate the required number of destinations. Similarly, the source code in the fourth word of FIG. 2 may likewise occupy two or more words of a message block depending upon the number of bits required to distinguish between all of the possible sources.

Following the source code in FIG. 2 is a plurality of data words comprising the substance of the message blocks. This data is supplied by the user of the system as a parallel or serial sequence of binary bits which the B-stations 12 through 19 arbitrarily divide up into eight-bit words. Users of the system may therefore provide their own error control by way of redundant coding.

Figure 3:
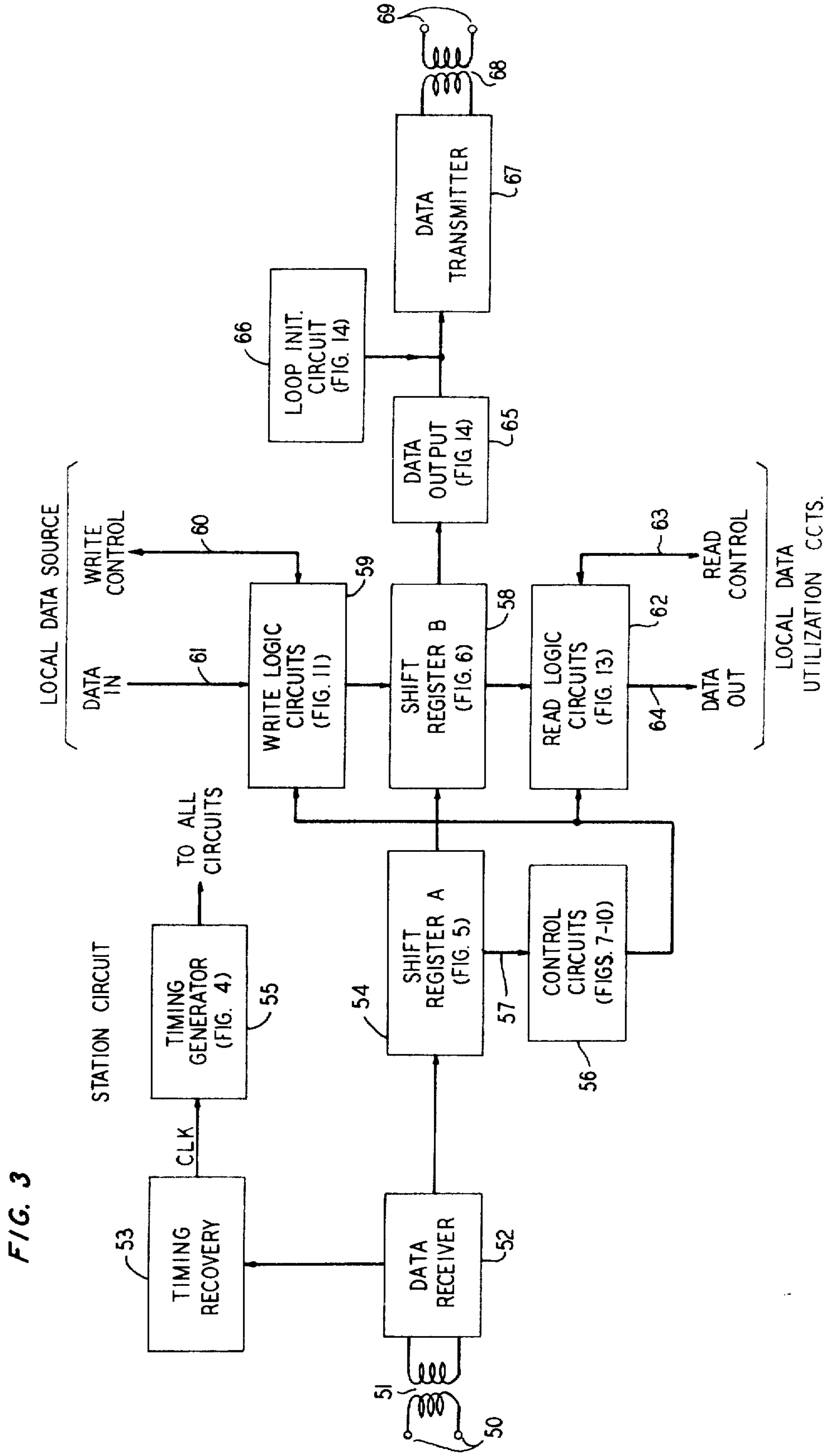
FIG. 3 is a general block diagram of a station circuit suitable for use in the system of FIG. 1.

In FIG. 3 there is shown a general block diagram of a station circuit useful as A- or B-stations in the communication system of FIG. 1. Digital signals traversing a loop appear at input terminals 50 and are applied via isolating transformer 51 to data receiver 52. Data receiver 52 demodulates the received signals and, if necessary, translates the binary signals to the appropriate voltage levels required for the balance of the circuits, passing the signals to timing recovery circuit 53 and shift register 54.

Timing recovery circuit 53 utilizes the pulse repetitions of the message block to synchronize a local clock in order to provide timing information for the balance of the circuits. The clock pulses thus provided are supplied to timing generator circuit 55 which provides all of the timing pulses required to synchronize the operations of the balance of the circuit. The timing generator 55 will be discussed in greater detail in connection with FIG. 4.

Figure 5:
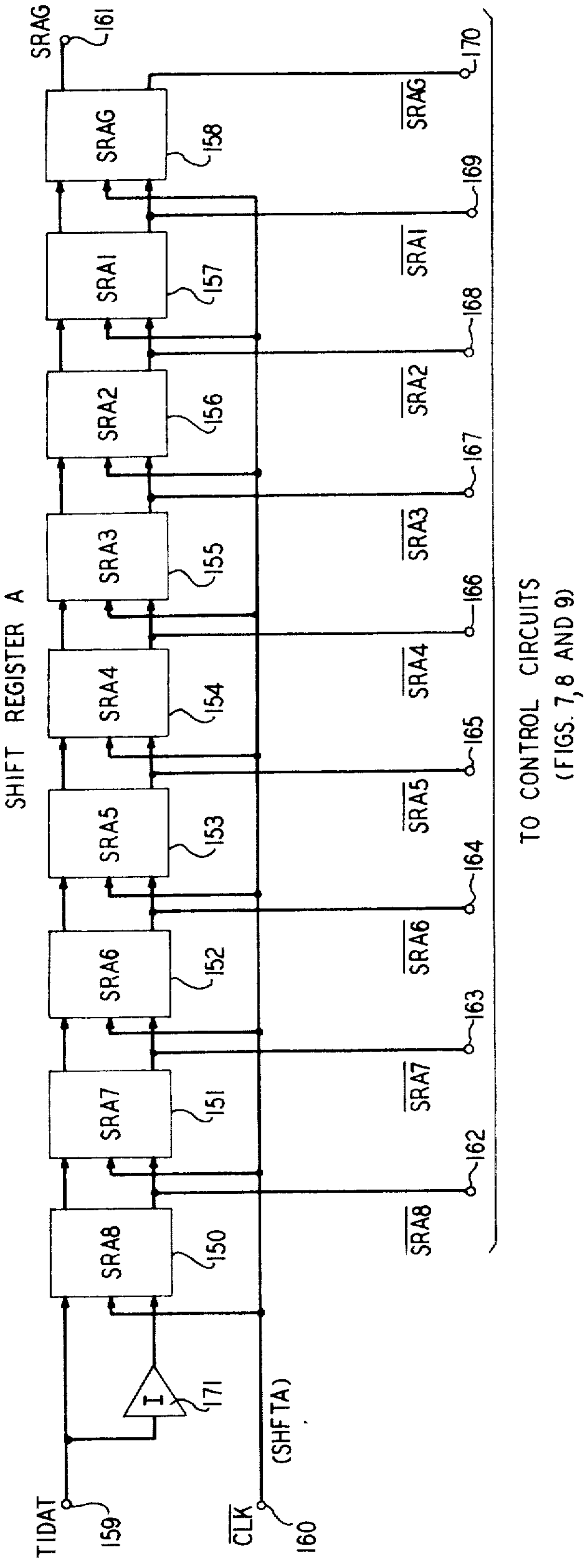
FIG. 5 is a detailed circuit diagram of a parallel read shift register useful as Shift Register A in FIG. 3.

Shift register 54, which will be described in greater detail in connection with FIG. 5, is a serial input, serial output, nine-bit shift register having parallel access to all of the stages for reading purposes. Thus, the outputs of all of the stages of shift register 54 are made available to control circuits 56 by way of leads 57.

The control circuits 56 respond to the various codes in the first three words of each message block to initiate and control the operation of the station circuit of FIG. 3. Control circuits 56, for example, detect the Start-of-Block synchronizing code, detect the data block control word, and detect the loop destination code. These control circuits will be discussed in greater detail in connection with FIGS. 7 through 10.

The output of shift register 54 is applied to shift register 58 which is an eight-stage, serial input, serial output shift register with both parallel reading and parallel writing access thereto. Thus, write logic circuits 59, under the control of signals from control circuits 56 and signals from a local data source by way of leads 60, control the writing of data appearing on leads 61 in series or in parallel into shift register 58. Similarly, read logic circuits 62, under the control of signals from control circuits 56 and signals on read control leads 63, permit the reading, in series or in parallel, of message words from shift register 58 onto data output leads 64. It can thus be seen that message blocks can be entered into and removed from the transmission loop one word at a time by way of shift register 58.

The serial output of shift register 58 is applied to data output circuit 65, to be discussed in more detail in connection with FIG. 14. In general, data output circuit 65 inserts or reinserts the one-bits in the guard spaces between message words and, when necessary, interchanges the source and destination codes in order to return undelivered messages to the sender.

A loop initialization circuit 66 is provided for A-stations only and is used to initialize the loop when message block framing is lost. In general, this is accomplished by inserting nine zeroes followed by all ones on the loop. The loop initialization circuit 66 will be discussed in more detail in connection with FIG. 14.

The output of data output circuits 65 is applied to a data transmitter 67 which may be used to remodulate the data to the desired frequency range for transmission on the loop. This modulated data is transmitted by way of isolating transformer 68 and output terminals 69 to the transmission loop.

The block diagram of FIG. 3 performs all of the functions necessary for A- or B-stations in FIG. 1. Slight modifications are required for A-station use. Clock signals, for example, may be provided from a local pulse source rather than from a timing recovery circuit 53. The read and write logic circuits 62 and 59 are not required since no data access takes place at the A-station. The loop initialization circuit 66, however, is required. Most of the balance of the circuitry of FIG. 3 can be identical in B-stations and in A-stations. Indeed, substantial manufacturing savings may be effected by constructing a single station which can be manually modified to serve as either an A-station or a B-station.

In order to better understand the various control signals utilized in the realization of FIG. 3, as illustrated in detail in FIGS. 4 through 14, the logic signals appearing on each lead have been indicated by an alphanumeric sequence which forms a code for the logic value. For a better understanding of these signals, the following glossary of logic terms is provided and can be referred to in connection with the balance of the figures.

GLOSSARY OF TERMS

| | |
|---|---|
| ADAT | A-station loop data |
| ASCW | Enable A-station control codes to SRB |
| BCT(X) | Bit counter flip-flop X |
| BDAT | B-station loop data |
| BLC(X) | Block length counter; bit X |
| BLOV | Block length oversize |
| BLUN | Block length undersize |
| BSCW | Enable B-station control codes to SRB |
| CLK | Clock |
| CRRQ | Common read request |
| CWOT(X) | Data block control word out; bit X |
| ENLDB | Enable Loading of B-Register |
| ENWR | Enable write |
| ESIN | Enable serial input |
| ESWR | Enable serial write |
| FCC1D | Block full and has not passed A-station code detected |
| FCC2D | Block full and passed A-station code detected |
| FCC3D | Block full with S and D interchanged code detected |
| FERR | Format Error |
| FGSYC | Format loop generated sync (write 9 zeroes) |
| FLCI(X) | Foreign/logical control word in; bit X |
| FRMT | Format loop |
| HCZD | HC field zero detected |
| HPFF | HOG prevention flip flop |
| ICSD | Interchange source and destination codes |
| IN(X) | Parallel data in; bit X |
| INSR | Enable input to SRB |
| K(X) | Bit X input to SRB |
| LC(X)D | LC field bit X detected |
| LCDAT | Loop closing buffer data out |
| LDSRB | Load shift register B |
| LPCW | Loop Closing Buffer Write Gate |
| NCZD | Nine consecutive zeroes detected in SRA |
| NRSET | Nine consecutive zeroes detected reset |
| OUT(X) | Parallel data out; bit X |
| PRSTB | Parallel read strobe |
| PWSTB | Parallel write strobe |
| PBLC | Reset Block Length Counter |
| RD | Terminal reading data from line |
| RDC | Terminal reading common message |
| RDP | Terminal reading private message |
| RDRQ | Read request |
| SFLC | Start format loop cycle |
| SIN | Serial data input |
| SHFTB | Shift register B |
| SOBD | Start of Block detected |
| SOUT | Serial data out |
| SRA(X) | Shift register A; bit X |
| SRB(X) | Shift register B; bit X |
| SRSET | Start of block reset |
| SRSTB | Serial read strobe |
| SWSTB | Serial write strobe |
| TAD | Terminal destination comparison gate |
| TC(X)D | TC field bit X detected |
| TDAD | Terminal destination address detected |
| T1CLK | T1 repeater clock |
| T1DAT | T1 repeater data |
| T9 | Bit time 9 |
| T9CLK | Bit time 9 clock |
| VCCD | Vacant control code detected |
| WCT(X) | Word counter; bit X |
| WD(X) | Word time X |
| WR | Terminal writing data onto line |
| WRRQ | Write request |
| WS(X) | Wired source address; bit X |
| WSSR | Enable wired source code to SRA |
| WOT9 | Word zero bit time nine |
| WOT9D | WOT9 Delayed |
| W1T9 | Word one bit time nine |
| XCLK | Crystal clock |
| ZERO | Contents of SRA is zero |

Figure 4:
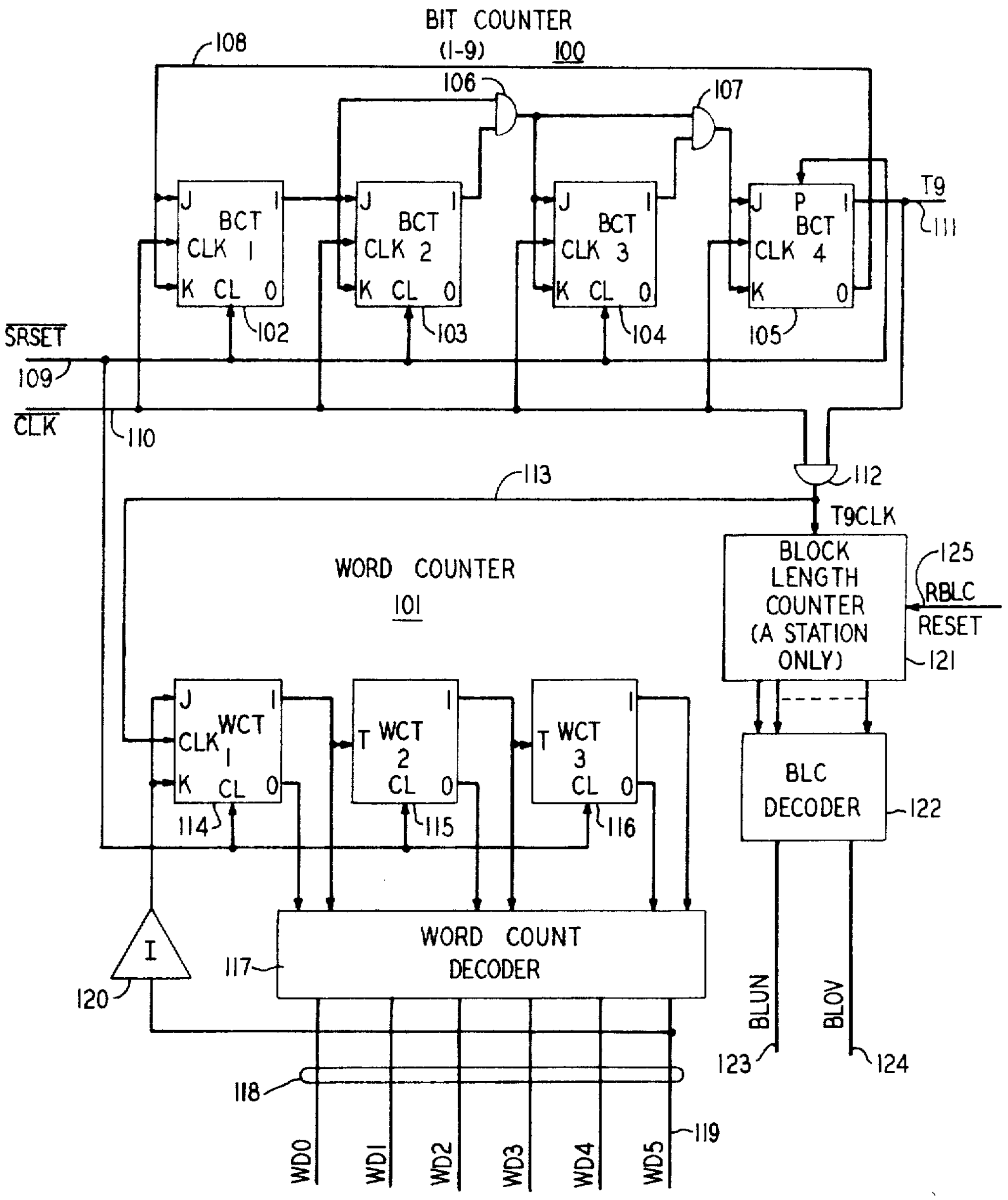
FIG. 4 is a detailed circuit diagram of a timing generator circuit useful in the station circuit of FIG. 3.

In FIG. 4 there is shown a detailed circuit diagram of a timing generator circuit useful as timing generator 55 in FIG. 3. The timing generator of FIG. 4 comprises a four-stage bit counter 100 and a three-stage word counter 101. Bit counter 100, in turn, comprises stages 102, 103, 104 and 105 and is arranged to recycle after a count of nine by means of AND gates 106 and 107 and a feedback path 108 from counting stage 105 to counting stage 102. The bit counter 100, after being preset to an initial state by an SRSET signal on lead 109, counts clock pulses on lead 110, producing an output pulse on lead 111 once for every nine clock pulses. This T9 pulse on lead 111 is combined with a clock pulse on lead 110 in AND gate 112 to provide a T9CLK pulse on lead 113. This T9CLK pulse forms the input to word counter 101.

Word counter 101 comprises stages 114, 115 and 116 connected in cascaded fashion and having the outputs of each of these stages supplied to a word count decoder 117. Word counter 101, after being preset to an initial state by a signal on lead 109, counts T9CLK pulses on lead 113. Word count decoder 117 utilizes the binary outputs of stages 114, 115 and 116 to provide output signals sequentially on output leads 118. The signals on leads 118 delineate the word intervals illustrated graphically in FIG. 2. The output on the last word lead 119 is supplied by way of inverting circuit 120 to disable the input to stage 114. In this way, the word counter 101 counts up to a word count of five and then remains latched there until reset by a signal on lead 109.

When the circuits of FIG. 4 are used in an A-station, a block length counter 121 is also provided to count the words in the entire message block. A block length decoder 122 provides an output signal on lead 123 when the block length count is less than the desired value and provides an output signal on lead 124 when the block length count exceeds the desired block length. These underlength (BLUN) and overlength (BLOV) signals are used to control the loop initialization circuits to be described hereinafter in connection with FIG. 14. Counter 121 is reset to its initial state by a RBLC signal on lead 125.

Referring to FIG. 5, there is shown a detailed circuit diagram of shift register A, useful as shift register 54 in FIG. 3. The shift register of FIG. 5 comprises nine stages, 150 through 158. Serial input data (derived from data receiver 52 in FIG. 3) appears at input terminal 159 and is applied directly to the set input of the first stage 150, and through inverter 171, to the reset input of stage 150. Inverted clock pulses (from timing recovery circuits 53 in FIG. 3) appear at terminal 160 and are applied to all of stages 150 through 158 to advance the data signals through these stages. The serial output pulses from the shift register of FIG. 5 appear at output terminal 161.

The individual stages 150–158 of the shift register of FIG. 5 also provide parallel output signals to output terminals 162 through 170, respectively. It is therefore apparent that data can be written into the shift register of FIG. 5 in a serial fashion from terminal 159, may be read out of shift register A in a serial fashion via terminal 161, and may be read out of shift register A in parallel by way of terminals 162 through 170. The outputs at terminals 162 through 170 are connected to the control circuits 56 (FIG. 3) which will be discussed in more detail in connection with FIGS. 7 through 9. In general, the first three words of each message block, as they pass through the shift register of FIG. 5, are applied in parallel to the control circuits of FIGS. 7 through 9 to control the operation of the station.

Figure 6:
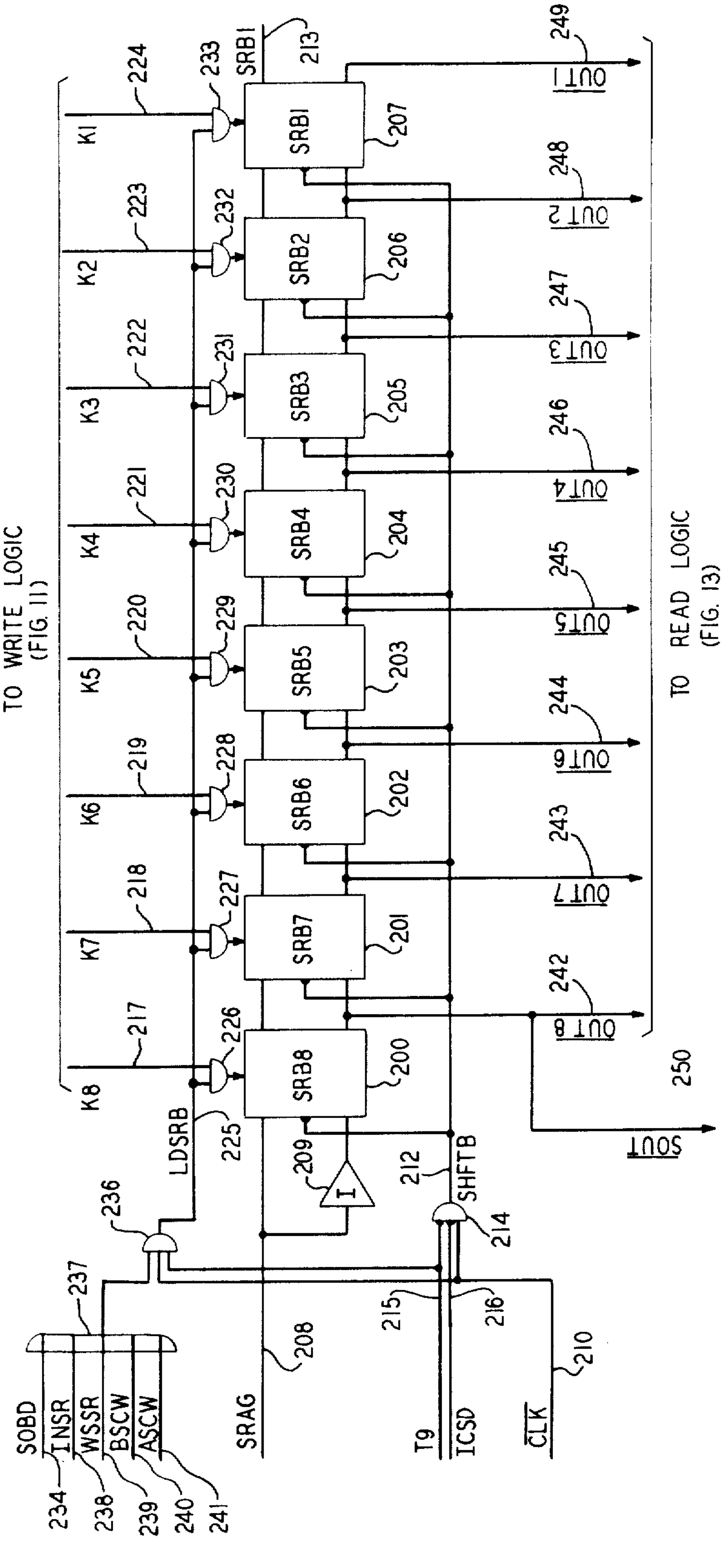
FIG. 6 is a detailed circuit diagram of a parallel read-write shift register useful as Shift Register B in FIG. 3.

Referring more particularly to FIG. 6, there is shown a detailed circuit diagram of shift register B, useful as shift register 58 in FIG. 3. The shift register of FIG. 6 comprises eight stages, 200 through 207. Serial data, appearing at input lead 208 (derived from terminal 161 in FIG. 5), is applied to the first stage 200 both directly and after inversion in inverted 209. Shift pulses appearing on bus 212 are applied to all of the stages 200–207 to advance data through these stages. Serial output data appears on output lead 213.

The shift pulses on bus 212 are derived from gate 214, having one enable input and two disable inputs. Inverse clock pulses from lead 210 are applied to the enable input. The output of AND gate 500 (FIG. 12) is applied to one disable input, and T9 timing pulses (from lead 111 in FIG. 4) are applied to the other disable inputs of gate 214. Shift register B therefore advances only during the eight word-bit intervals and no advance takes place during the T9 clock pulse interval as determined by T9 signals on lead 215.

The ICSD signal on lead 216 is also applied to disable gate 214. This signal indicates that the source and destination codes at the beginning of the message block should be interchanged to return an undelivered message block to the sender. This is accomplished by retaining the destination code in shift register B and gating the source code from shift register A. This procedure will be described in greater detail in connection with FIG. 14.

Shift register B in FIG. 6 can be loaded in parallel from input leads 217 to 224 by means of a loading signal on bus 225. The loading signal on bus 225 is applied simultaneously to AND gates 226 through 233 to gate signals from leads 217 to 224, respectively, to the corresponding one of stages 200 through 207, and to force these stages to the corresponding states, whether "0" or "1."

The loading signal on bus 225 is derived from the output of AND gate 236. Gate 236, in turn, is enabled by the simultaneous application of an inverse clock pulse from lead 210, a T9 pulse from lead 215, and the output from OR gate 237. The inputs to OR gate 237 comprise a signal on lead 234, indicating the detection of a start of block signal, a signal on lead 238, indicating that data input is available for writing into shift register B; a signal on lead 239, indicating that the local source code is available for writing into shift register B; a signal on 240, indicating that station control codes for a B-station are available for writing into shift register B; and, finally, a signal on lead 241, indicating that station control codes for an A-station are available for writing into shift register B.

Figure 13:
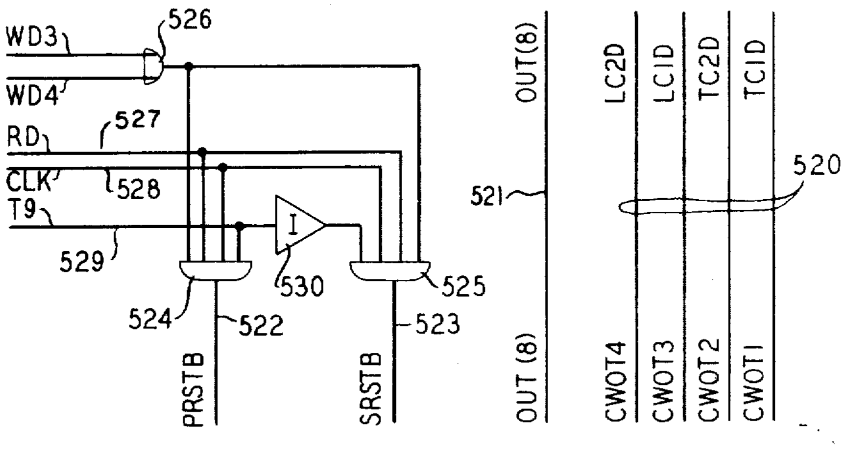
FIG. 13 is a detailed circuit diagram of a read logic circuit useful in the station circuit of FIG. 3.

Parallel outputs from stages 200 through 207 are available on leads 242 through 249, respectively, for delivery to the read logic circuit of FIG. 13. The output of stage 200 appearing on output lead 242 can also be used as a serial output of the same data when it is delivered by way of lead 250.

It can be seen that the shift register of FIG. 6 provides serial input, serial output, parallel write-in and parallel read-out. In general, shift register B provides the access point to which locally derived data may be entered into a message block on the transmission loop and from which data can be read from the message block to a local data utilization circuit. Such reading and writing is done in words of eight bits, one word at a time, under the control of signals to be described hereinafter.

Figure 7:
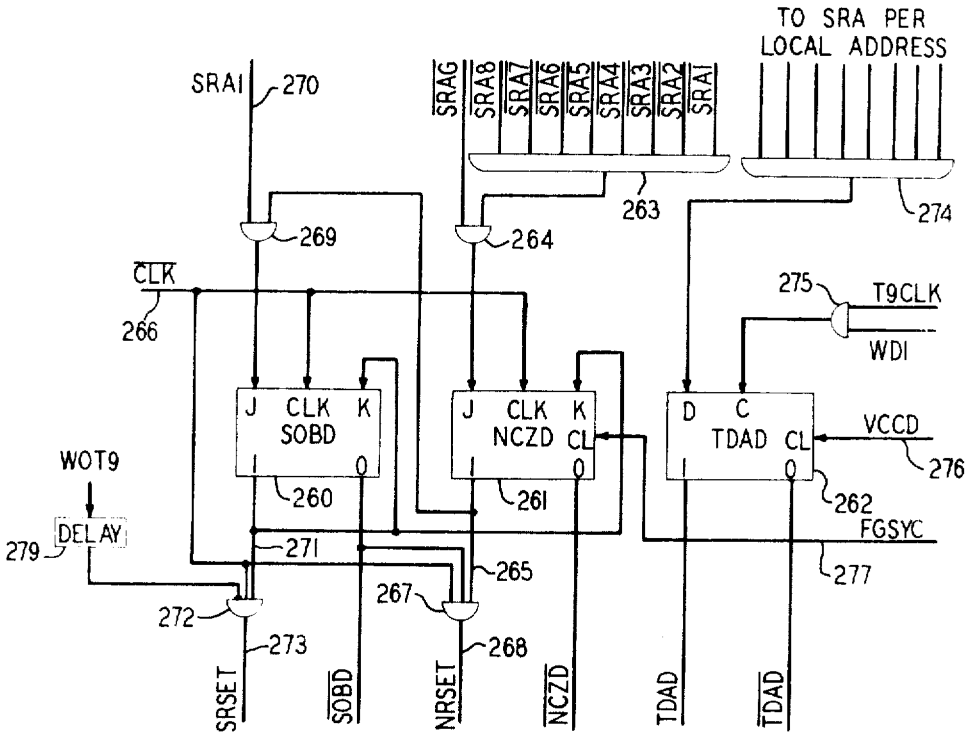
FIG. 7 is a detailed circuit diagram of a start-of-block and destination code detector useful in the control circuits of FIG. 3.

In FIG. 7 there is shown a detailed circuit diagram of a portion of the control circuits 56 of FIG. 3. The circuits of FIG. 7 comprise a Start-of-Block detector suitable for detecting the nine zeroes Start-of-Block synchronizing code illustrated in FIG. 2, and for detecting a destination code corresponding to the local data utilization circuit. To this end, three flip-flops 260, 261 and 262 are provided. An AND gate 263 detects zeroes in the first eight stages of shift register A of FIG. 5 while AND gate 264 utilizes this condition in coincidence with a zero output from the last stage to produce a signal to set NCZD flip-flop 261. An output is thus produced on output lead 265, which upon the appearance of the next succeeding clock pulse at lead 266, and provided there is no "0" output from flip-flop 260, fully enables AND gate 267 to provide an NRSET reset signal on lead 268. This reset signal is used to initialize all of the circuits of the station for the reception of the message block. It will be noted that only the first word of a message block will present nine consecutive zeroes to this detection circuit and thus provides a unique framing signal for the message block.

The output of flip-flop 261, appearing on lead 265, is also applied to one input of AND gate 269. A "1" signal output from the next to last stage of shift register A, appearing on lead 270, completes the enablement of AND gate 269, setting Start-of-Block detecting flip-flop 260 to the 1-output state, thus providing a signal of lead 271. This output on lead 271 is applied to AND gate 272 which, when completely enabled by the next clock pulse on lead 266, and provided no delayed WOT9D pulse from delay circuit 279 appears, provides an output pulse to lead 273. This output pulse is used to preset the counters 100 and 101 of the timing generator of FIG. 4 and thus initiate a timing cycle. Flip-flops 260 and 261 are reset by the 1-output of flip-flop 260 appearing on lead 271. Flip-flop 261 may be set to the "1" output condition by an FGSYC signal on lead 277 from FIG. 14, indicating that loop initialization is taking place.

It can be seen that flip-flops 260 and 261, together with the associated logic circuitry, detect the Start-of-Block synchronizing code and detect the next following guard bit to initiate the timing signals. Each new message block resynchronizes the station timing circuits by way of these detection circuits.

Also shown in FIG. 7 is a terminal destination address detector comprising flip-flop 262 which is set by the output of AND gate 274. The eight inputs to AND gate 274 are wired to the stages of shift register A in FIG. 5 according to a pattern which detects the address code of the local data utilization circuits.

Flip-flop 262 can be set only in the presence of an output from AND gate 275 to which there is applied the T9CLK pulses from lead 113 in FIG. 4 and the WD1 pulses from the appropriate one of leads 118 in FIG. 4. Flip-flop 262 is reset by a VCCD signal on lead 276, indicating that the received block is vacant or unused. It can thus be seen that flip-flop 262 is set whenever the message being received is destined for the local B-station and is reset if the message block is vacant. The output of flip-flop 262 is used (in FIG. 10) to initiate a block reading sequence.

Before proceeding to a description of the balance of the control circuits corresponding to block 56 in FIG. 3, it is first convenient to describe the format of the data block control word appearing as the second word in each message block. The eight-bit control word is divided up into four fields of two bits each. These fields are assigned in accordance with Table I.

TABLE I

Data Block Control Word Format

| Bit Position | Bit I.D. | | Description |
|---|---|---|---|
| SRA8 | H2 | ) | |
| SRA7 | H1 | ) | Hog Prevention Control Field HC |
| SRA6 | | ) | |
| SRA5 | | ) | Not Used |
| SRA4 | LC2 | ) | |
| SRA3 | LC1 | ) | Loop Vacant-full control Field LC |
| SRA2 | TC2 | ) | |
| SRA1 | TC1 | ) | Type of Message Control Field TC |

Figure 8:
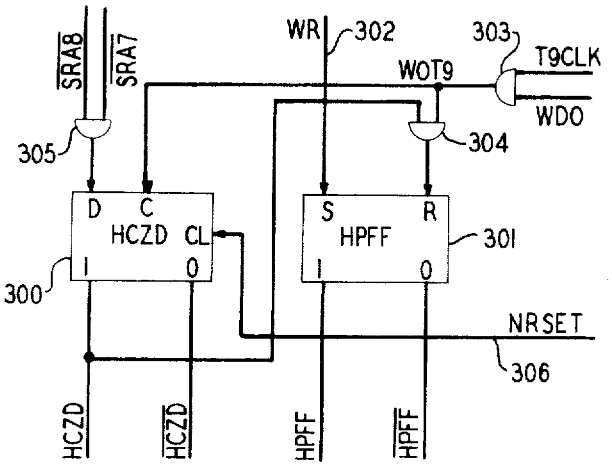
FIG. 8 is a detailed circuit diagram of a hog prevention control circuit useful in the control circuits of FIG. 3.

In FIG. 8 there is shown a detailed circuit diagram of the logical arrangement necessary to prevent the monopolization of a local loop by one or more pairs of transmitting-receiving B-stations. This problem is referred to as "hog prevention" and arises because the stations intervening between a transmitting and a receiving station can be locked out of access to the circuit if the transmitting station presents a continuous load to the transmission loop. In general, the hog prevention circuits set a marker at a transmission station at the time of each transmission and prevent that station from initiating further transmissions until all other stations have satisfied their transmission requirements.

The hog prevention control circuit of FIG. 8 comprises an HC field zero detection flip-flop 300 and a hog prevention flip-flop 301. Flip-flop 301 is set by a signal on lead 302 each time the local station writes a message block into the loop. Flip-flop 301 is reset during the T9 clock pulse interval of word WDO as determined by the output of AND gate 303, providing flip-flop 300 is in the "1" state to complete the enablement of AND gate 304.

Flip-flop 300 is set to the "1" state by the simultaneous appearance of zeroes in the seventh and eighth bit positions of shift register A as determined by AND gate 305. These bit positions correspond to the hog control field HC of the data block control word as it resides in shift register A. Flip-flop 300 can be set only during the appearance of an output from AND gate 303 (during the T9 clock pulse interval of word WDO). Flip-flop 300 can be reset by an NRSET signal on lead 306, indicating a detection of a new start-of-block synchronizing signal. Flip-flop 300 is thus reinitialized for each new message block. The operation of a circuit of FIG. 8 will be discussed in more detail hereinafter in connection with the overall hog prevention system.

Figure 9:
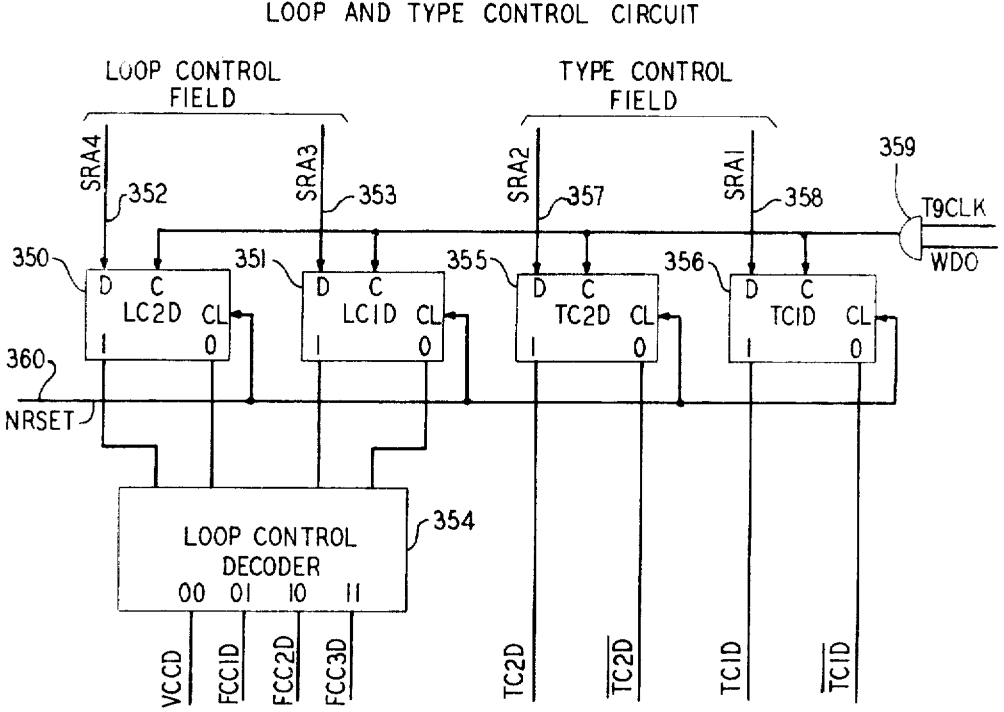
FIG. 9 is a detailed circuit diagram of a loop and type control circuit useful in the control circuits of FIG. 3.

In FIG. 9 there is shown a detailed circuit diagram of the control circuits responsive to the loop control field LC and the type control field TC. The circuit of FIG. 9 comprises a pair of flip-flops 350 and 351 which respond to the loop control field in bit positions SRA4 and SRA3, respectively, appearing on leads 352 and 353. The outputs of flip-flop 350 and 351 are applied to a loop control field decoder 354. Decoder 354 may comprise a simple AND gate matrix to decode the loop control field bits into one-out-of-four control signals. These signals are described in Table II.

TABLE II

Loop Vacant/Full Control Signals

| Binary | Logical | Description |
|---|---|---|
| 00 | VCC | Block Vacant |
| 01 | FCC1 | Block Full; A-Station not passed |
| 10 | FCC2 | Block Full; A-Station passed once |
| 11 | FCC3 | Block Full; A-Station passed twice |

The flip-flops 355 and 356 are used to store the type control field appearing on leads 357 and 358, respectively, from the last two stages of shift register A. All of flip-flops 350, 351, 355 and 356 are enabled only during the appearance of a T9 clock pulse during a word WDO, as determined by the output of AND gate 359. All of flip-flops 350,351, 355 and 356 are reset by an NRSET signal on lead 360 at the beginning of each new message block. The type control field bits are interpreted as shown in Table III.

TABLE III

Type of Message Control Field

| Binary | Logical | Description |
|---|---|---|
| 00 | LPM | Private Message |
| 01 | LCM | Common Message |
| 10 | UFM1 | Undeliver able Foreign Message |
| 11 | UFM2 | Undeliver able Foreign Message - FS and FD Interchanged |

Figure 10:
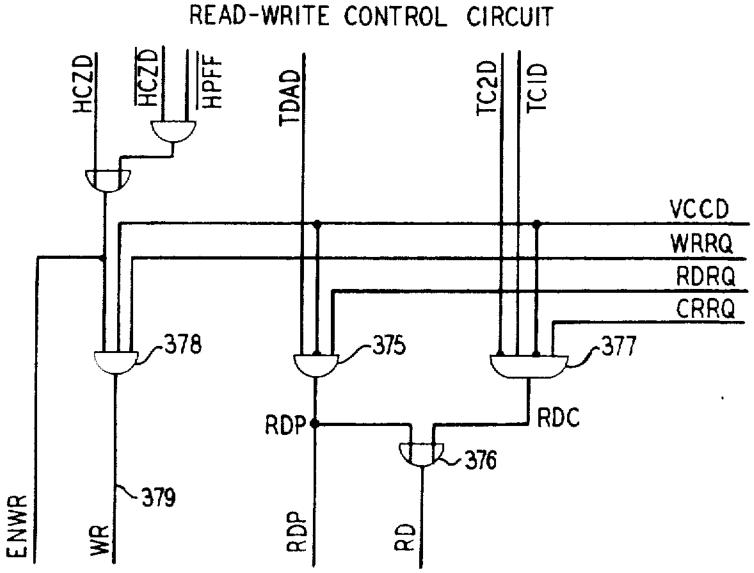
FIG. 10 is a detailed circuit diagram of a read-write control circuit useful in the control circuit of FIG. 3.

In FIG. 10 there is shown a detailed logic diagram for the read-write control circuits forming a part of block 56 in FIG. 3. The gates of FIG. 10 implement the logical equations to be described below.

READ A PRIVATE MESSAGE FROM THE BLOCK

In order to read a private message appearing on the local loop, AND gate 375 implements the following logical equation:

$$RDP = RDRQ \cdot TDAD \cdot \overline{VCCD}. \quad (1)$$

The logical term RDRQ is a read request from the local data utilization circuits. The TDAD signal is derived from FIG. 7 and indicates that the destination of the message on the loop is the local B-station. The logical term $\overline{VCCD}$, derived from FIG. 9, indicates that the message block is not vacant but indeed does carry a message. The concurrence of these conditions or logical signals provides an output from gate 375 and also provides an output from OR gate 376. These output signals perform the following functions. The contents of the loop and type control fields are gated out to the local data utilization circuits as the control word output (CWOT) bits as shown in FIG. 13. The corresponding positions in shift register B are set to zero. In addition, the source code in the fourth word position of the message block is also gated to the local data utilization circuits. Finally, all of the data bits from the message block are also gated to the local utilization circuits.

READ A COMMON MESSAGE FROM THE BLOCK

Gate 377 implements the following logical equation:

$$RDC = CRRQ \cdot LCMD \cdot \overline{VCCD}, \quad (2)$$

where $$LCMD = \overline{TC1D} \cdot \overline{TC2D}. \quad (3)$$

The common read request signal *CRRQ* is provided by the local station and indicates a readiness to receive the common message. The inverted vacant control code detected signal VCCD is identical to that described with reference to Equation (1). The local common message detected signal LCMD is defined in Equation (3). The output of gate 377 is also applied to OR gate 376. As a result of these outputs, the command word output (CWOT) bits, the loop source code, and the data bits are all gated to the local station. The message block, however, is in this case left unaltered to permit the delivery of the common message to other stations on the loop on a broadcast basis.

WRITE A MESSAGE INTO THE BLOCK

Gate 378 in FIG. 10 implements the following logical equation:

$$WR = WRRQ \cdot ENWR \cdot VCCD, \quad (4)$$

where $$ENWR = HCZD + \overline{HCZD} \cdot \overline{HPFF}. \quad (5)$$

The logical term WRRQ is derived from the local station and indicates a desire to write a message into the local loop. The VCCD signal indicates that the message block is empty and hence available for writing. The ENWR signal, as indicated in Equation (5), is a special enabling signal which permits writing only if the special hog prevention conditions exist. Thus the term HCZD indicates that the hog prevention control field is all zeroes, and hence no unsatisfied write requests have been made previously on the loop. The second term of Equation (5) indicates that writing is enabled even if zeroes were not detected in the hog prevention control field, provided that the hog prevention flip-flop 301 (FIG. 8) has not been set. This latter term indicates that the previous message on the loop was not inserted by this station.

The complete enablement of gate 378 provides a signal on lead 379 which sets the loop control field to "01, " indicating the FCC1 condition which marks the block as being full. At the same time, the type control field is set by locally supplied bits (FLCI), identifying the type of message being transmitted. During successive word times this control word, a destination code, a source code and the data words are all written into shift register B (FIG. 6). As discussed in connection with FIG. 8, the hog prevention flip-flop 301 is also set.

Figure 11:
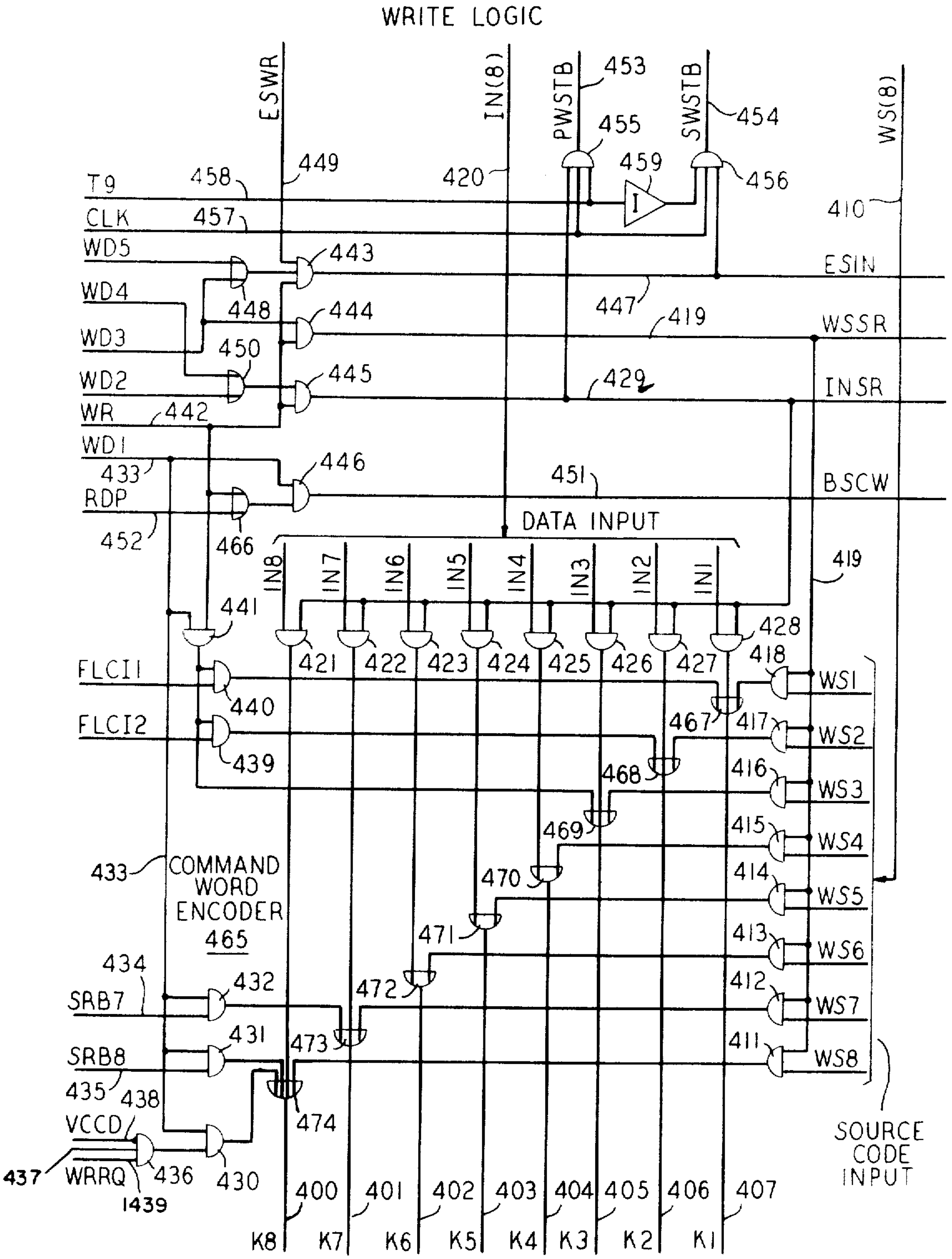
FIG. 11 is a detailed circuit diagram of a write logic circuit useful in the station circuit of FIG. 3.

In FIG. 11 there is shown a detailed circuit diagram of the write logic circuits corresponding to block 59 in FIG. 3. The write logic circuits comprise a plurality of write leads 400 through 407 which are supplied to shift register B, as shown in FIG. 6. Each of these leads can be enabled by the output of the connected one of OR gates 467 through 474, respectively. The outputs of each of OR gates 467 through 474 may be driven to the logic "1" state by the enablement of any one of a plurality of logical AND gates to which it is connected.

A wired source code identifying the local station is delivered by way of cable 410 to AND gates 411 through 418. When completely enabled by a signal on WSSR bus 419, gates 411 through 418 deliver the source code through OR gates 467–474 to leads 400 through 407 to be registered in shift register B. Similarly, data words appearing on cable 420 are supplied to AND gates 421 through 428. When completely enabled by a signal on INSR bus 429, gates 421 through 428 deliver data words via OR gates 467–474 to the leads 400 through 407, respectively, for registry in shift register B.

The data block control words are generated in command word encoder 465 at the left side of the wired matrix of FIG. 11. Gates 430, 431 and 432, for example, generate the hog control field bits which are inserted on leads K7 and K8 in response to the WD1 pulse on lead 433. These hog control bits are normally merely reinserted from the seventh and eighth bit positions of shift register B on leads 434 and 435, respectively. The eighth bit position, however, can also be filled by the output of AND gate 430, derived from inhibit gate 436. Gate 436 is enabled by a write request *WRRQ* signal on lead 1439 occurring simultaneously with a $\overline{\text{HPFF}}$ signal on lead 437 and is disabled by a block vacant *VCCD* signal on lead 438. As will be discussed in more detail hereinafter, gate 436 writes a "1" into the H2 bit position to indicate that the local station wishes to write a message but cannot do so because the block is not vacant.

The foreign-local control word input (FLCI) bits are introduced at gates 439 and 440. These gates are enabled by the output of AND gate 441 during the word WD1 interval as indicated by a signal on lead 433, and during a write operation, as indicated by a signal on lead 442. The output of gate 441 is also used to write a "1" into the third bit position of the control word corresponding to the TC2 bit. This forces the loop control field to the "01" state, indicating that the block is full.

Gating signals are provided to the word writing circuits of FIG. 11 from AND gates 443, 444, 445 and 446. The output of AND gate 443 on ESIN bus 447 enables serial input data to be written into a message block. Gate 443 is partially enabled, via OR gate 448, during the third word interval for the destination code and during the fifth and following word intervals for writing data. An ESWR signal is also required on lead 449, indicating that the local station wishes to write in a serial fashion. The enablement of gate 443 is completed by a WR write signal on lead 442.

AND gate 444 provides the WSSR gating signal on bus 419 and is enabled during the third word period for write operations to gate the wired source code in parallel into shift register B.

Gate 445 provides an output INSR signal on bus 429 for gating data in parallel into shift register B and is enabled during the second and fourth word periods by the output of OR gate 450.

Gate 446 provides an output BSCW signal on bus 451 during the word WD1 interval indicating that a command word is being written into shift register B. Gate 446 is fully enabled by a "private" read request on lead 452 or a write request on lead 442, both of which are applied through OR gate 466.

The local data source is provided with strobing signals on leads 453 and 454. The PWSTB signal on lead 453 is provided by gate 455 during the T9 clock interval and during parallel input as indicated by an INSR signal on bus 429. The SWSTB strobe on lead 454 is supplied by gate 456 to which there is applied an ESIN signal from bus 447, a clock pulse from lead 457 and a T9 pulse from lead 458, inverted in inverter circuit 459. Lead 454 is therefore energized during the entire word interval and is not energized during the guard space.

Figure 12:
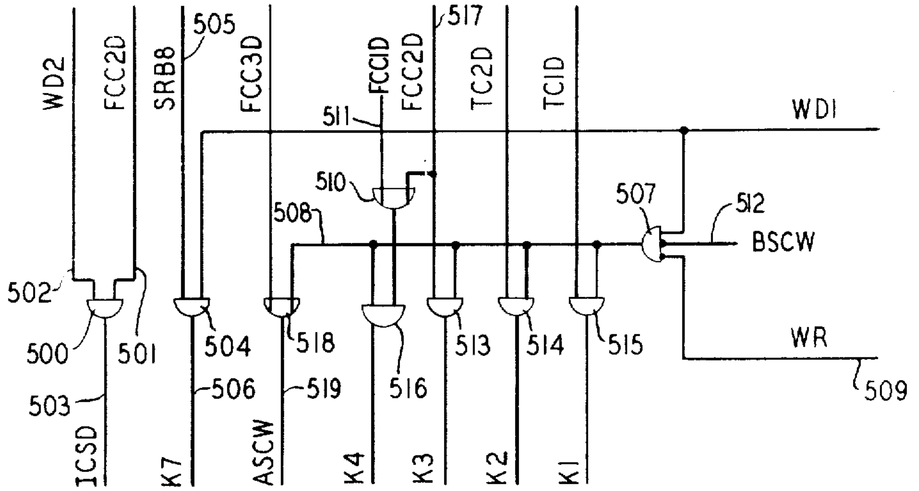
FIG. 12 is a detailed circuit diagram of a command word encoder useful in the write logic circuit of FIG. 11 when used in an A-station.

Referring to FIG. 12, there is shown a detailed logic diagram of a command word encoder suitable for use as encoder 465 in the write logic circuit of FIG. 11 when FIG. 11 is used for an A-station. The encoder of FIG. 12 comprises an AND gate 500 to which there is applied an FCC2D signal on lead 501 from the loop control decoder of FIG. 9 and a word WD2 pulse on lead 502. As can be seen in Table II, the FCC2D signal indicates that the full message block has passed the A-station once and hence has circulated entirely around the loop without being delivered. During the second word interval, gate 500 is fully enabled to produce an ICSD signal at output lead 503, indicating that the source and destination codes should be interchanged so as to return the message block to its source. This returning message block then indicates that the destination is busy or otherwise unavailable for delivery of the message.

The hog prevention scheme requires that the A-station substitute the H2 bit for the H1 bit and set the H2 bit to zero. To this end, gate 504 is used to gate the control word bit from the eighth bit position (H2) on lead 505 into the seventh bit position (H1) on lead 506. Gate 504 is fully enabled during the word WD1 interval during which the command word is written into shift register B (FIG. 6).

The loop control field and type control field are also written during the word WD1 interval as determined by the output of gate 507 on ASCW bus 508. Gate 507 is disabled by a WR signal on lead 509 or a BSCW signal on lead 512 and is enabled by a word W1 pulse. When fully enabled, gate 507 provides an output to gates 513, 514, 515 and 516. At this time, gates 514 and 515 gate the type control field from FIG. 9 into shift register B. At the same time, the loop control field is written into the LC2 (K4) and LC1 (K3) positions of the code word. The FCC2D signal on lead 517 is gated directly to the LC1 (K3) bit position and the FCC1D signal on lead 511 and FCC2D signal on lead 517 are ORed in gate 510 and gated to the LC2 (K4) bit position. The signal on line 508 is applied to OR gate 518 along with an FCC3D signal to produce an ASCW signal on lead 519.

The logic of FIG. 12 implements the following rules for station busy situations:

1. If the detected loop control field is "01" (FCC1D), indicating that the block is full and that the A-station has not yet been passed, set the loop control bits to "10" (FCC2) to now indicate that the A-station has been passed once.
2. If the detected loop control field is "10" (FCC2D), indicating that the block is full and that the A-station has been passed once, then set the loop control field to "11" (FCC3) to indicate that the A-station has been passed twice.
3. If the detected loop control field is equal to "11" (FCC3D), indicating that the A-station has been passed twice, set the loop control field to "00" (VCC), indicating that the block is now vacant.

It can be seen that these logic rules keep track of the length of time that undelivered message blocks remain in the loop. After circulating around the loop twice without being delivered, the message block is returned to the sender, indicating that it has not been delivered. This is accomplished simply by exchanging the source and destination codes. A message which passes an A-station with an FCC3D code is erased, thus preventing loop blocking by unwanted messages.

FIG. 8, in combination with gates 500 and 504 of FIG. 12, and gates 436, 430, 431 and 432 in FIG. 11, implements the following strategy for hog prevention:

1 When a B-station writes a message, the hog prevention flip-flop (HPFF) in that station is set to "1" (FIG. 8) and the HC field is circulated on the loop unmodified (FIG 11).

2. If any other B-station on the loop whose HPFF flip-flop (FIG. 8) is not set wishes to write a message (*WRRQ*) when a full block is detected, the HC2 bit of the hog prevention control field is set to "1" (gate 430 in FIG. 11).

3. If a B-station detects a *VCCD* vacant block signal (gate 378 in FIG. 10) and:

a. if the HC field is "0," writing is independent of the state of HPFF flip-flop 301 (FIG. 8);

b. if the HC field is not "0," the B-station can write if, and only if, the HPFF flip-flop 301 is reset to "0".

4. When a data block passes an A-station (FIG. 12) the HC2 bit replaces the HC1 bit and the HC2 bit is set to "0."

5. The HPFF flip-flop 301 for each B-station is reset when HC1 and HC2 are both "0" (gate 305 in FIG. 8).

It can be seen that the above logic scheme prevents line blocking since, after a B-station sends a message, it is prevented from sending another message until all other requests on the line are serviced.

In FIG. 13 there is shown detailed logic circuitry for the read logic circuit 62 in FIG. 3. The circuit of FIG. 13 comprises a set of four leads 520 taken from flip-flops 350,351, 355 and 356 of FIG. 9. Signals on these leads represent the received loop and type control fields which are delivered to the local data utilization circuits as command words CWOT1 through CWOT4. The parallel outputs of shift register B (FIG. 6) are delivered on leads 521 to the local data utilization circuits. The local data utilization circuits are also provided data strobing signals on leads 522 and 523 to time parallel reading (on lead 522) and serial reading (on lead 523) of the received data. Signals on leads 522 and 523 are derived from AND gates 524 and 525, respectively.

Word pulses during the third and fourth word intervals are combined in OR gate 526 and supplied to each of AND gates 524 and 525. A read pulse on lead 527 is also delivered to gates 524 and 525. A clock pulse on lead 528 is also delivered to AND gates 524 and 525. Finally, a T9 pulse is delivered on lead 529 during the guard interval to gate 524 to permit parallel gating during the guard interval, and, after inversion in inverter 530, is applied to gate 525 to permit serial reading during the word interval itself.

In FIG. 14 there are shown data output circuits useful in the station circuit of FIG. 3. The output from shift register B in FIG. 6 appears on lead 550 in FIG. 14 and is applied to gate 551. Gate 551 is normally enabled and this output is applied by way of OR gate 552 to timing gate 553. When it is necessary to interchange the source and destination codes during the WD2 word interval, an ICSD signal appears on lead 554 from FIG. 12 to enable gate 555 and, by way of inverter 556, to disable gate 551. It can thus be seen that the destination code in shift register A and appearing on lead 557 is gated through gates 555 and 552 while the source code remains stored in shift register B. In the following word interval, the signal is removed from ICSD lead 554 and the source code can be read out of shift register B by way of gate 551. The interchange of source and destination codes is thereby achieved. T9 clock pulses on lead 558 inhibit gates 551 and 555 during the guard interval.

Data is serially inputed into the loop at gate 560. This data, appearing on lead 561, is enabled by an ESIN serial input enabling signal on lead 562. This enabling signal on lead 562 is also used to disable gate 551 during normal message forwarding. The T9 clock pulse on lead 558 also disables gate 560 during the guard interval.

Gate 563 is utilized to insert guard pulses into the guard pulse interval. To this end, T9 clock pulses on lead 558 are applied to gate 563. Gate 563 is fully enabled, however, only if there is no start-of-block code detected in FIG. 7 as indicated by a signal on lead 564. At the time the start-of-block code is detected and the flip-flop 260 in FIG. 7 is set, the ninth zero is inserted in the guard space by the disablement of gate 563.

During the last bit interval of the word preceding these nine "0's," as indicated by a signal on lead 565 from flip-flop 261 in FIG 7, AND gate 566 becomes fully enabled to write a "1" into this last bit position of the word. This insures that the nine "0's" framing signal occurs unambiguously at the start of each message block.

The output of retiming gate 553 is applied to transmission converter 589 at the triggering input of flip-flop 567. The "1" and "0" outputs of flip-flop 567 are applied to AND gates 569 and 570, respectively. The output of AND gate 553 is also applied to AND gates 569 and 570, while the outputs of gates 569 and 570 are applied across the center-tapped primary winding of transformer 571.

The purpose of the transmission converter 589 is to convert the unipolar output pulses from gate 553 into bipolar pulses on output leads 572. Successive "1's" at the output of gate 553 set and reset flip-flop 567. AND gates 569 and 570 are therefore alternately partially enabled. The data pulses from gate 553 complete the enablement of gates 569 and 570 to drive transformer 571 alternately with signals of opposite polarity. Such signals are, of course, less likely to produce a direct current drift when transmitted on transmission line 572.

When the data output circuits of FIG. 14 are used in an A-station, a loop initialization circuit 573 is also provided and is inserted in series with line 590 at terminals 591. Loop initialization circuit 573 includes a format flip-flop 574 which is set by the SFLC output of OR gate 575. OR gate 575, in turn, is enabled by the output of gate 576 or by a signal on lead 577 from FIG. 4, indicating that the number of words in the data block have exceeded the specified value. Alternatively, AND gate 576 is enabled by the simultaneous appearance of signals on leads 578 and 592 and absence of a signal on lead 579, indicating that the number of words in the data block is less than required and no synchronization cycle is in progress. The signal on lead 578 is taken from FIG. 7 and indicates that the start-of-block synchronizing signal has been received. The signal on lead 579 is taken from FIG. 4 and indicates that the necessary number of words have not yet been received to make up a message block. The signal on lead 592 is taken from FIG. 7 and indicates that nine zeroes have been detected. Flip-flop 574 is therefore set to initiate a loop initialization sequence if the block length exceeds the fixed value (BLOV), or if a start-of-block signal is received before the desired block length is reached (BLUN). The SFLC signal on lead 592 is also used as the RBLC signal in FIG. 4 to reset block length counter 121 (FIG. 4) and thus initiate a new block count.

When set, flip-flop 574 enables AND gate 580 to allow clock pulses from pulse source 581 to be transmitted through OR gate 582 to message block register 583. In this way, the message block can be filled with "1's" for initialization. When the block length count again reaches BLOV, gate 584 is enabled during the T9 clock pulse interval and flip-flop 574 is reset. At the same time, the FGSYC signal on lead 586 is applied to reset flip-flop 261 in FIG. 7, initiating a start-of-block signal generation sequence.

Pulse source 581 may be a crystal oscillator and provides the basic timing for the entire local loop. Its pulse repetition rate is recovered and used for retiming purposes at each B-station on the loop. Register 583 is of sufficient size to prevent the message block from overloading the storage capacity of the loop. Register 583 may, for example, be large enough to contain an entire message block, in which case there will be a delay between message blocks equal to the overall transmission time around the loop. Register 583 may, however, be of a smaller size and the storage capacity of the loop itself be taken advantage of for storing portions of the message block.

Flip-flop 574 remains set so long as AND gate 584 is not enabled. AND gate 584 detects the next coincidence of a block length oversize (BLOV) signal on lead 577, a "1" output from flip-flop 574, and a T9CLK pulse on lead 585. When fully enabled, AND gate 584 provides an output on lead 586 which is used in FIG. 7 to reset the zero detecting flip-flop 261. When the output from AND gate 584 appears, this signal is used to reset flip-flop 574. At this time, flip-flop 574 enables AND gate 588 to pass the output of OR gate 552 through OR gate 582 to register 583. The output of register 583 is, of course, supplied to AND gate 553.

It can be seen that the operation of the loop initialization circuit 573 is to insert into the loop, via AND gate 580, a string of "1's" from pulse source 581. After a full block of "1's" has been inserted into the loop by way of gate 580, the block length counter 121 in FIG. 4 again reaches the value to energize BLOV lead 124 (FIG. 4), thus completing the enablement of AND gate 584 (FIG. 14) by way of lead 577. The FRMT format flip-flop 574 is therefore reset, terminating the insertion of "1's." At the same time, the FGSYC signal on lead 586 is applied to NCZD flip-flop 261 in FIG 7, setting this flip-flop and causing an output to appear at lead 265. When the first "1" appears at the output of shift register A (SRA1) on lead 270 (FIG. 7), AND gate 269 becomes enabled to set SOBD flip-flop 260 and, on the next clock pulse, provides an SRSET pulse on lead 273. As can be seen in FIG. 6, this SRSET signal on lead 234 gates an all "0's" code into shift register B, providing the first eight "0's" of the SOB code. In FIG. 14, the AND gate 563 provides the ninth "0" by disabling the T9 pulse on lead 558 due to the setting of SOBD flip-flop 260 (FIG. 7) as described above. The B-stations on the loop are now able to use this message block as described above for writing messages which can thereafter be read by other stations.

The monopoly prevention or use allocation scheme of the present invention has been disclosed in connection with a single loop transmission system for convenience only. Such a scheme is equally suitable in a multiple intersecting loop transmission system such as that disclosed in the copending application of J. R. Pierce, Ser. No. 79,185, filed of even date herewith and assigned to applicant's assignee. It is, therefore, to be understood that the above-described arrangements are merely illustrative of the numerous and varied other arrangements which may constitute applications of the principle of the invention. Such other arrangements may readily be devised by those skilled in the art without departing from the spirit or scope of this invention.

What is claimed is:

1. A closed loop digital transmission system comprising
   a closed loop transmission line,
   a plurality of access stations for writing digital messages into, and reading digital messages from, said line,
   each said message including a plurality of use allocation bits,
   means at each of said stations for marking said allocation bits for each of said stations attempting to write a digital message onto said line when said line already contains a digital message, and
   means at each of said stations for disabling the writing of a second message until all other of said stations are serviced.

2. The closed loop digital transmission system according to claim 1 further comprising
   a regeneration station for regenerating digital messages on said loop, and
   means at said regeneration station for altering said allocation bits.

3. The closed loop digital transmission system according to claim 2 wherein
   said means for marking said allocation bits includes means for setting a first of said bits to a preselected logical state, and
   said altering means at said regeneration station includes means for setting a second one of said bits to the logical value of said first bit, and setting said first bit to the opposite logical value.

4. The closed loop digital transmission system according to claim 1 wherein said disabling means comprises
   storage means for registering the transmission of a message block, and
   means responsive to said storage means for blocking further transmissions from that station registering said transmission.

5. A digital station for closed loop transmission systems comprising
   a shifting register in series with said loop for serially reading digital data from said loop and serially writing said digital data into said loop,
   parallel data access means for writing data into and reading data from said register,
   control signal detection means responsive to signals in said register for controlling the operation of said data access means,
   means included in said signal detection means for detecting a condition indicating that another station is seeking to write data into said loop, and
   means for disabling said data access means until said other station completes a data writing operation.

6. The digital station according to claim 5 wherein
   said digital data is in the form of a message block of a plurality of words of equal length separated by guard signals,
   the initial ones of said words comprising control signals, and
   said disabling means comprises
   - a flag register,
   - means for setting said flag register when a message is written into said loop, and
   - means for resetting said flag register when selected portions of initial words have a preselected value.

7. The digital station according to claim 6 wherein one of said initial words includes a monopoly prevention field, and
   means for marking said monopoly prevention field in response to an attempt to write data into an already-filled message block.

8. The digital station according to claim 7 further including
   means for altering said monopoly prevention field on successive transits of said field around said loop.

9. A data transmission system comprising
   a closed loop transmission line,
   a synchronizing repeater in said loop,
   a plurality of stations on said loop for inserting digital message blocks into, and removing said message blocks from, said loop,
   means at said stations for marking each said message whenever a nonoriginating one of said stations requests the use of said loop, and
   means responsive to markings in said message for preventing an originating station from inserting a message block into said loop again until all of said requests have been satisfied.

10. The data transmission system according to claim 9 further including
   means for modifying said markings each time a message passes said synchronizing repeater.

* * * * *